US010153722B2

(12) United States Patent
Lin et al.

(10) Patent No.: US 10,153,722 B2
(45) Date of Patent: Dec. 11, 2018

(54) SYSTEM AND METHOD FOR DETECTING ABNORMAL STATE OF VELOCITY OUTPUTTED FROM MOTOR

(71) Applicant: TECO Electric & Machinery Co., Ltd., Taipei (TW)

(72) Inventors: Chia-Jen Lin, Taipei (TW); Feng-Chieh Lin, Taipei (TW); Cheng-Hsuan Sung, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 46 days.

(21) Appl. No.: 15/457,131

(22) Filed: Mar. 13, 2017

(65) Prior Publication Data
US 2018/0234045 A1  Aug. 16, 2018

(30) Foreign Application Priority Data

Feb. 10, 2017 (TW) .............................. 106104446 A

(51) Int. Cl.
*H02P 29/10* (2016.01)
*G05B 23/02* (2006.01)

(52) U.S. Cl.
CPC .......... *H02P 29/10* (2016.02); *G05B 23/0218* (2013.01); *G05B 2219/34013* (2013.01)

(58) Field of Classification Search
CPC ..................................................... H02K 11/21
USPC ........................................................ 318/651
See application file for complete search history.

(56) References Cited

U.S. PATENT DOCUMENTS

| 2003/0034928 | A1* | 2/2003 | Murakado | ................. | H01Q 1/12 343/757 |
| 2013/0193894 | A1* | 8/2013 | Kiguchi | ................... | H02P 3/00 318/490 |
| 2015/0083528 | A1* | 3/2015 | Kattainen | ............. | B66B 5/0031 187/393 |

* cited by examiner

*Primary Examiner* — Kawing Chan
*Assistant Examiner* — Bradley Brown
(74) *Attorney, Agent, or Firm* — Muncy, Geissler, Olds & Lowe, P.C.

(57) ABSTRACT

A system includes a control module, a velocity-detecting module and a state-analyzing module. The control module generates a control command to control the servo drive system, and bases on the control command to define angular-acceleration standard ranges with respect to detection times. The velocity-detecting module detects output angular-velocity values of the servo motor with respect to detection times upon when the servo motor is driven. The state-analyzing module includes a processing unit and an abnormal-state judging unit. The processing unit stores the output angular-velocity values, and bases on the output angular-velocity values to calculate output angular-acceleration values with respect to the detection times. The abnormal-state judging unit determines whether or not each of the output angular-acceleration values with respect to each of the corresponding detection times is within the respective angular-acceleration standard range and thereby to generate corresponding comparison results.

5 Claims, 11 Drawing Sheets

SYSTEM AND METHOD FOR DETECTING ABNORMAL STATE OF VELOCITY OUTPUTTED FROM MOTOR

This application claims the benefit of Taiwan Patent Application Serial No. 106104446, filed Feb. 10, 2017, the subject matter of which is incorporated herein by reference.

BACKGROUND OF THE INVENTION

(1) Field of the Invention

The invention relates to a system and a method for detecting abnormal states of a motor, and more particularly to the system and the accompanying method for detecting an abnormal state of velocity outputted from a motor.

(2) Description of the Prior Art

It has been almost 200 years since the first appearance of the motor. At the early stage of development, the motor was simply an experimental prototype of electromagnetic coils. Now, various types of motors have been developed to meet versatile requirements. In order to serve different needs, specific types of motors are usually introduced. For example, if a motor with frequent-varying speeds is needed, then a servo motor could be a better choice.

Generally, a controller is applied to issue and transmit a control command to the servo motor, then the servo motor would run in accordance with the control command from the controller. The major feature of the servo motor is that the user can utilize the controller to regulate precisely the rotational speed. In addition, since the adjustable range of rotational speed is pretty wide, the servo motor can thus run steadily, and can change speeds arbitrarily according to the control command. It shall be mentioned that such a servo motor can run steadily even at an extreme low speed, and can rapidly respond to the control command of the controller.

In order to enable the servo motor to run normally, the user needs to investigate the servo motor frequently so as not to damage the servo motor and further to delay the operations. Conventionally, the user needs firstly to integrate the controller, the servo motor and a driver of the servo motor to an oscilloscope, and a screen of the oscilloscope would display rotational-speed feedback signals of the control command and the servo motor. Then, the user can judge waveform deviations between feedback signals from the control command and the servo motor, such that normal operations of the servo motor can be ensured.

From waveforms of the rotational-speed feedback signals of the control command and the servo motor displayed on the screen of the oscilloscope, inevitable bias between the real rotational speed of the servo motor and the command rotational speed instructed by the control command is hard to be told simply by naked eyes. Thereby, it is difficult to determine whether or not the inevitable bias is within an allowable range. Generally, misjudgment is quite possible. In addition, since investigating the servo motor by naked eyes, even at one single servo motor, would waste plenty of time, thus mass investigations by naked eyes upon a large amount of the servo motors will be definitely laborious and cost a lot.

SUMMARY OF THE INVENTION

In view that the conventional investigation upon operations of the servo motor generally leads to inaccurate and mass investigations by naked eyes upon a large amount of the servo motors are laborious and costly, accordingly, it is an object of the present invention to provide a system for detecting an abnormal state of velocity outputted from a motor, that can be applied to investigate a servo motor of a servo drive system. The system of the present invention includes a control module, a velocity-detecting module and a state-analyzing module. The control module, communicatively connected with the servo drive system, is to generate a control command for controlling the servo drive system and to base on the control command to define a plurality of angular-acceleration standard ranges with respect to a plurality of detection times.

The velocity-detecting module, communicatively connected with the servo drive system, is to detect a plurality of output angular-velocity values of the servo motor with respect to a plurality of detection times upon when the servo motor is driven. The state-analyzing module includes a processing unit and an abnormal-state judging unit. The processing unit, communicatively connected with the velocity-detecting module, is to store the output angular-velocity values and to base on the output angular-velocity values to calculate a plurality of output angular-acceleration values with respect to the plurality of detection times.

The abnormal-state judging unit, connected with the control module and the processing unit, is to determine whether or not each of the output angular-acceleration values with respect to each of the corresponding detection times is within the respective angular-acceleration standard range and thereby to generate a plurality of corresponding comparison results. If at least one of the plurality of comparison results is negative, the corresponding at least one said detection time is defined as at least one abnormal state time for determining that the servo drive system is in an abnormal rotational-velocity state at the at least one abnormal state time.

In one embodiment of the present invention, the processing unit generates angular-velocity function data with respect to the plurality of detection times and the plurality of corresponding output angular-velocity values, and differentiates the angular-velocity function data to generate angular-acceleration function data. The state-analyzing module further includes a noise-filtering module communicatively connected with the abnormal-state judging unit so as thereby to filter out noise data of the angular-acceleration function data upon when a number of the at least one abnormal state time is greater than a preset abnormal threshold number.

In one embodiment of the present invention, the noise-filtering module further includes a clock unit and a noise-filtering unit. The clock unit is to define at least two of the plurality of detection times to be one of at least one time interval. The noise-filtering unit, electrically coupled with the clock unit, is to filter out the noise data in the angular-acceleration function data upon when the number of the at least one abnormal state time at each said time interval is greater than the preset abnormal threshold number.

In another aspect of the present invention, a method for detecting an abnormal state of velocity outputted from a motor, applied to determine whether or not a servo drive system is in an abnormal rotational-velocity state, includes a step (a) of capturing a plurality of output angular-acceleration values with respect to the servo motor at a plurality of detection times when a servo motor of the servo drive system is driven, a step (b) of determining whether or not each said output angular-acceleration value with respect to each said detection time is within the plurality of corresponding angular-acceleration standard ranges, and a step (c) of defining the at least one corresponding detection time as at least one abnormal state time for determining that the servo drive system is in the abnormal rotational-velocity state at the at least one abnormal state time if a result of the step (b) is negative.

In one embodiment of the present invention, prior to the step (a), the method further includes a step (d) of generating a control command for driving the servo drive system and basing on the control command to define the plurality of angular-acceleration standard ranges wish respect to the plurality of detection times.

In one embodiment of the present invention, the Step (a) further includes a step (a1) of, while the servo motor is driven, detecting a plurality of output angular-velocity values with respect to the servo motor at the plurality of detection times; and, a step (a2) of calculating the plurality of output angular-acceleration values from the plurality of output angular-velocity values. In addition, the plurality of output angular-velocity values are differentiated to obtain the plurality of output angular-acceleration values.

In one embodiment of the present invention, between the Step (a) and the Step (c), the method further includes a step (e) of basing on the plurality of detection times and the plurality of output angular-acceleration values to generate angular-acceleration function data.

In one embodiment of the present invention, after the Step (c), the method further includes: a step (f) of, after the servo drive system is judged to be in the abnormal rotational-velocity state at the at least one abnormal state time, determining whether or not the number of the at least one abnormal state time at the plurality of detection times is greater than a preset abnormal threshold number; a step (g) of, if a result of the Step (f) is negative, determining that the servo drive system is in a low-noise abnormal rotational-velocity state; a step (h) of, if the result of the Step (f) is positive, filtering out noise data in the angular-acceleration function data so as to form noise-filtered angular-acceleration function data, and determining whether or not the plurality of detection times in the noise-filtered angular-acceleration function data have the at least one abnormal state time; and, a step (i) of, if the result of the Step (h) is positive, determining that the servo drive system is in a high-noise abnormal rotational-velocity state.

In one embodiment of the present invention, at least two of the plurality of detection times are defined to be one of at least one time interval, and the Step (f) further includes a step (f1) of determining whether or not the number of the at least one abnormal state time in each said time interval is greater than the preset abnormal threshold number. If a result thereof is negative, then perform the Step (g). If the result thereof is positive, then perform the Step (h).

In the system and the method for detecting an abnormal state of velocity outputted from a motor in accordance with the present invention, the control module would generate a control command to have the servo motor to run at a higher output angular velocity. The velocity-detecting module and the processing unit are introduced to capture the output angular-acceleration values of the servo motor with respect to the detection times. The abnormal-state judging unit is to judge if or not the output angular-acceleration value of the corresponding detection time is within the respective angular-acceleration standard range. If the output angular-acceleration value falls out of the corresponding angular-acceleration standard range, then the respective detection time undefined as an abnormal state time for determining that the servo drive system is in an abnormal rotational-velocity state at the abnormal state time.

In addition, when the servo motor runs at a lower output angular velocity to cause the number of the abnormal state times in each time interval to be greater than the preset abnormal threshold number, then the noise-filtering unit can be applied to filter out the noise data in the angular-acceleration function data, such that the noise-filtered angular-acceleration function data can be formed. Then, it can be further determined if any detection time in the noise-filtered angular-acceleration function data is an abnormal state time.

By comparing to the prior art, the system and the method for detecting an abnormal state of velocity outputted from a motor provided by the present invention introduces the abnormal-state judging unit to determine whether or not the output angular-acceleration value of the corresponding detection time is within the respective angular-acceleration standard range. Thereupon, the present invention can completely replace the conventional art that uses naked eyes to compare the waveforms of the control command and the rotational-velocity feedback signal of the servo motor on the oscilloscope, so that inaccurate detections caused by misjudgment can be reduced to a minimum. In addition, by having the system and the method for detecting an abnormal state of velocity outputted from a motor in accordance with the present invention to detect the servo motor, additional expense and labor from conventional naked-eyes investigation can thus be substantially avoided.

All these objects are achieved by the system and method for detecting an abnormal state of velocity outputted from a motor described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a system and a method for detecting an abnormal state of velocity outputted from a motor. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
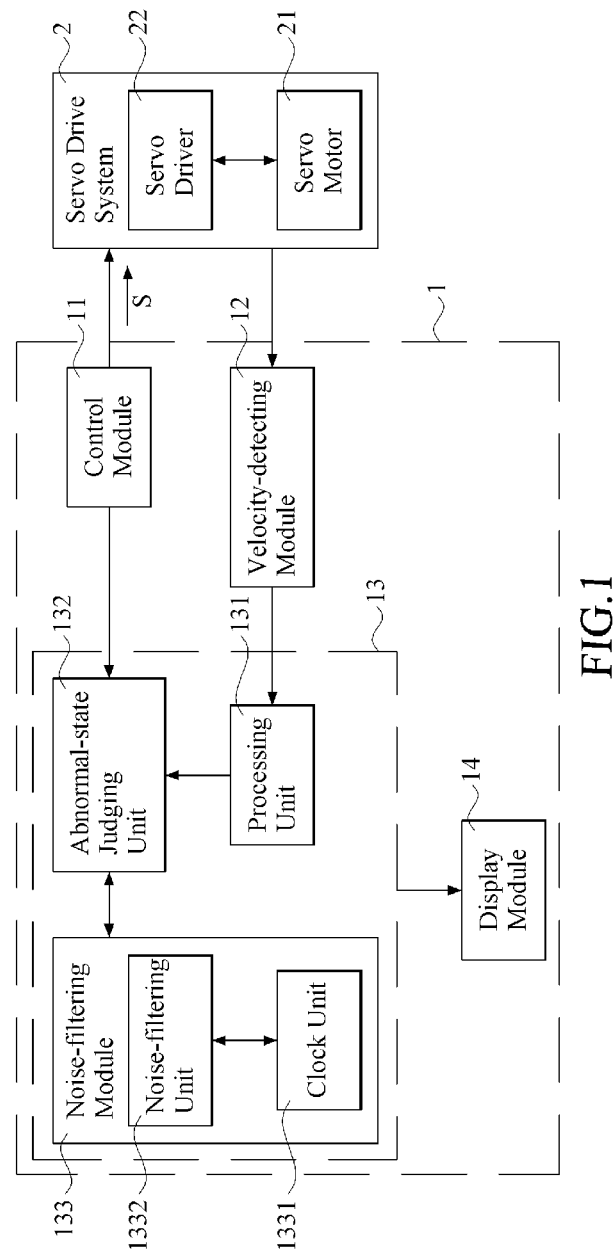
FIG. 1 is a schematic block view of a preferred embodiment of the system for detecting an abnormal state of velocity outputted from a motor invention accordance with the present invention.

Referring now to FIG. 1, a schematic block view of a preferred embodiment of the system for detecting an abnormal state of velocity outputted from a motor invention accordance with the present invention is shown. In this embodiment, the system for detecting an abnormal state of velocity outputted from a motor 1 is to detect a servo motor 21 of a servo drive system 2. The servo drive system 2 includes the servo motor 21 and a servo driver 22 for driving the servo motor 21. The system for detecting an abnormal state of velocity outputted from a motor 1 includes a control module 11, a velocity-detecting module 12, a state-analyzing module 13 and a display module 14. Practically, the system for detecting an abnormal state of velocity outputted from a motor 1 can be integrated to, but not limited to, be a field programmable gate array (FPGA).

For the control module 11 is communicatively connected with the servo drive system 2, the operator can apply an operational interface to handle the control module 11. Practically, the control module 11 can be, but not limited to, one of a micro control unit (MCU) and a programmable logic controller (PLC), and can also include, but also not limited to, an instruction register, an instruction decoder, a status register, a micro operational signal generator, a control chip or a control program. In addition, in this embodiment, the unit of the detection time is the millisecond (ins).

The velocity-detecting module 12, communicatively connected with The servo drive system 2, can be a cable or wireless module communicatively connected with the servo drive system 2. Practically, the velocity-detecting module 12 can, but be not limited to, include a time-capturing apparatus, a photoelectric tachometer, a contact tachometer or a speed-detecting program. The state-analyzing module 13 includes a processing unit 131, an abnormal-state judging unit 132 and a noise-filtering module 133. The processing unit 131 is communicatively connected with the velocity-detecting module 12. Practically, the processing unit 131 can, but be not limited to, include a micro calculator, an arithmetic logic unit, an accumulator or a register set.

The abnormal-state judging unit 132, connected with the control module 11 and the processing unit 131, can, but be not limited to, include an arithmetic logic unit, and an accumulator, a register set, a counter, an instruction register, an instruction decoder, a status register, a clock generator or a micro operational signal generator.

The noise-filtering module 133, communicatively connected with the abnormal-state judging unit 132, includes, but not limited to, a clock unit 1331 and a noise-filtering unit 1332. In the present invention, the clock unit 1331 can be, but not limited to, a counter or a clock generator. The noise-filtering unit 1332, electrically coupled with the clock unit 1331, can be, but not limited to, a low-pass filter, a high-pass filter, a band-pass filter, a band-stop filter, an all-pass filter, an atomic-line filter or a filter program. Also, the filter can be analogical or digital.

The display module 14, communicatively connected with the state-analyzing module 13, can be practical, but not limited to, a projection display, a stereoscopic imaging display, and organic LED display, an electronic paper, a system-on-panel, and LED display, an LCD monitor or a cathode ray tube display (CRT).

The control module 11 generates a control command S to control the servo drive system 2, and bases on the control command S to define a plurality of angular-acceleration standard ranges R's with respect to a plurality of detection times (illustrated respectively in FIG. 4, FIG. 6, FIG. 8 and FIG. 10).

While the servo motor 21 is driven, the velocity-detecting module 12 detects a plurality of output angular-velocity values of the servo motor 21 with respect to the plurality of detection times. In Physics, the unit of the output angular-velocity value is the radius per second (rad/s). In this embodiment, the unit of the output angular-velocity value is the revolution per minute (rpm).

The processing unit 131, storing the output angular-velocity values, bases on the output angular-velocity values to calculate a plurality of output angular-acceleration values with respect to the plurality of detection times. In Physics, the unit of the output angular-acceleration value is the radius per square second (rad/s$^2$). In this embodiment, the unit of the output angular-velocity value is the rpm/s. Also, the processing unit 131 generates angular-velocity function data with respect to the detection time and the corresponding output angular-velocity value, and bases on the differential angular-velocity function data to generate corresponding angular-acceleration function data. In the present invention, the angular-velocity function data includes a variable with respect to the detection time, and the processing unit 131 generates the angular-acceleration function data by differentiating the variable with respect to the detection time.

The abnormal-state judging unit 132 is to compare whether or not the output angular-acceleration value is within the corresponding angular-acceleration standard range R with respect to the detection time so as to generate one corresponding comparison result. Further, in the case that at least one of all the comparison results is determined to be negative, then the detection time(s) corresponding to the aforesaid at least one of all the comparison results would be defined as at least one abnormal state time. Thereupon, it can be determined that the servo drive system 2 is in an abnormal rotational-velocity state at the abnormal state time.

The clock unit 1331 defines one of at least one time interval from at least two detection times. While the number of the abnormal state times within each said time interval is greater than a preset abnormal threshold number, the noise-filtering unit 1332 would filter out one noise data of the angular-acceleration function data. In the present invention, factors to generate the noise data include, but not limited to, poor control gains and feedback quantification of the motor.

The display module 14 may display the angular-velocity function data and the angular-acceleration function data in a form of an EXCEL report, a curve plot or a table, such that the operator can easily observe the instant running status of the servo drive system 2.

Figure 2A:
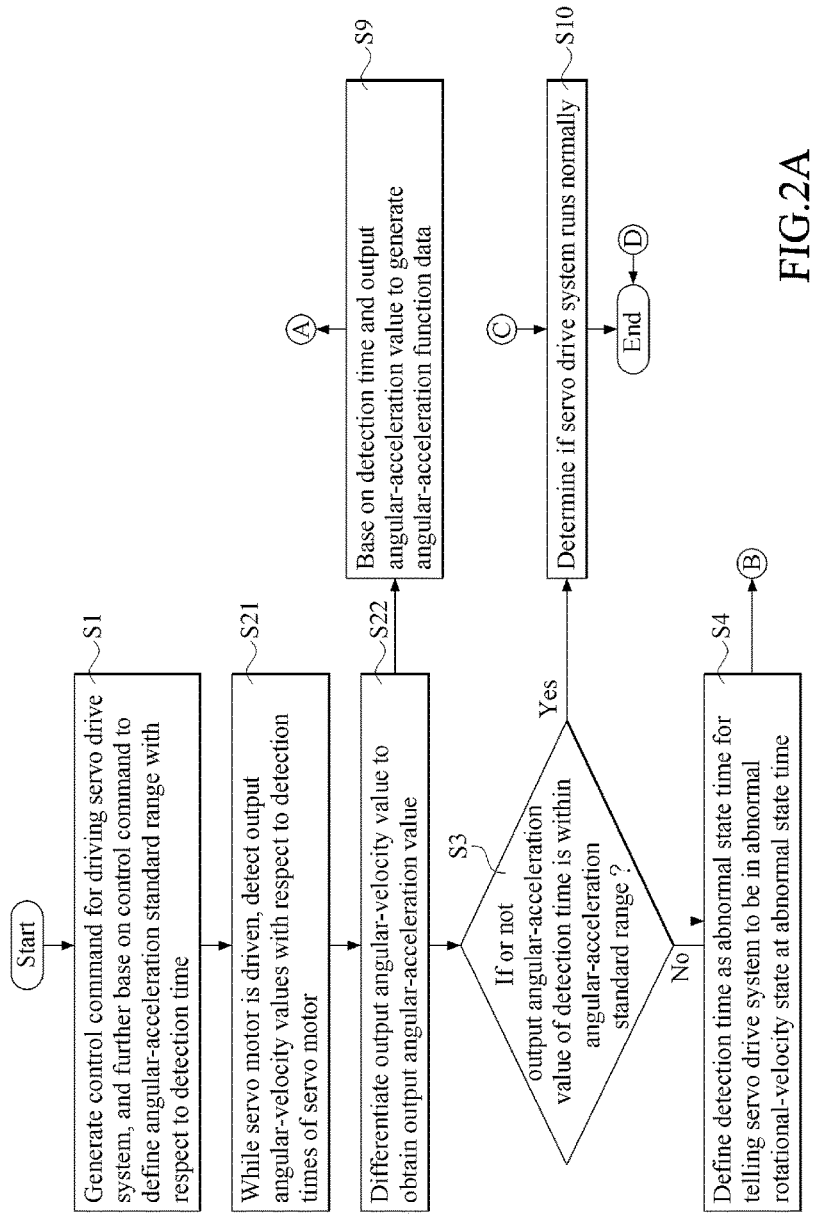
FIG. 2A and FIG. 2B together show a flowchart of the preferred method for detecting an abnormal state of velocity outputted from a motor in accordance with the present invention.
Figure 2B:
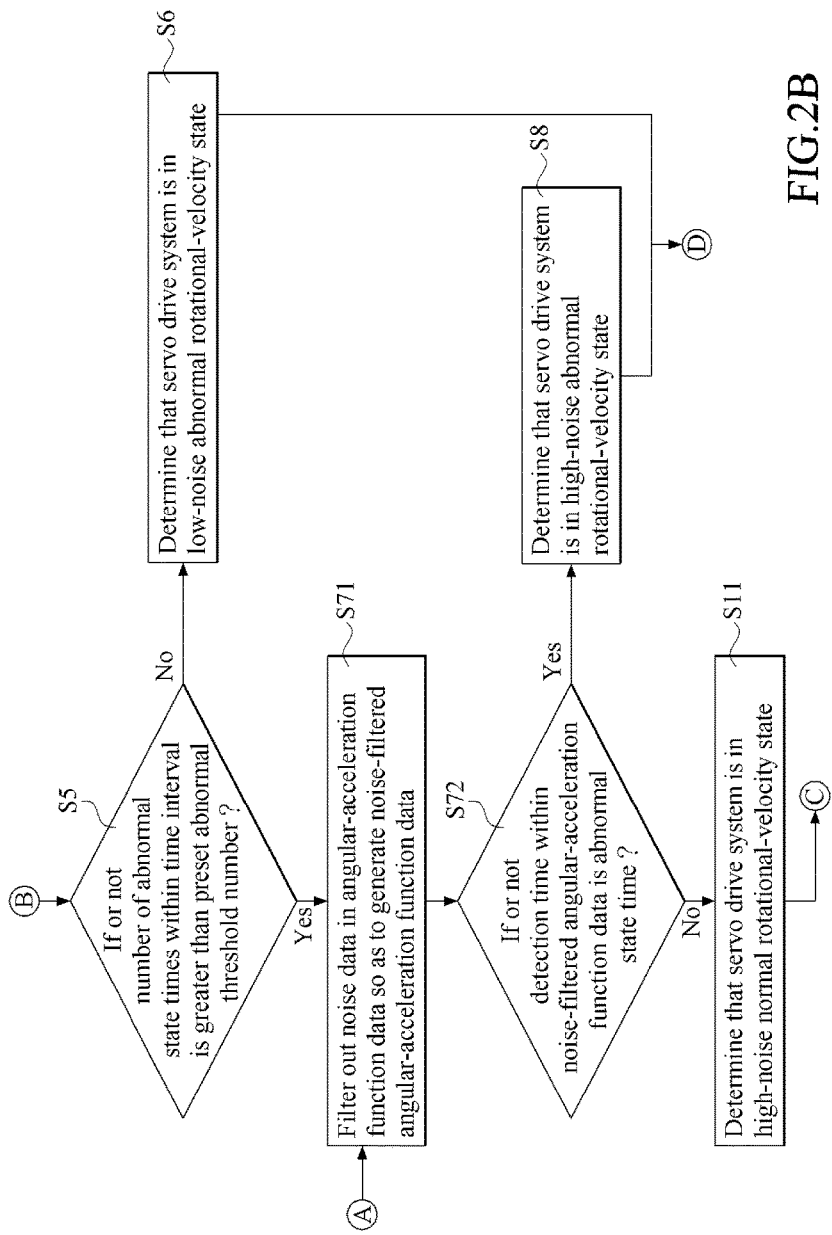
Figure 3:
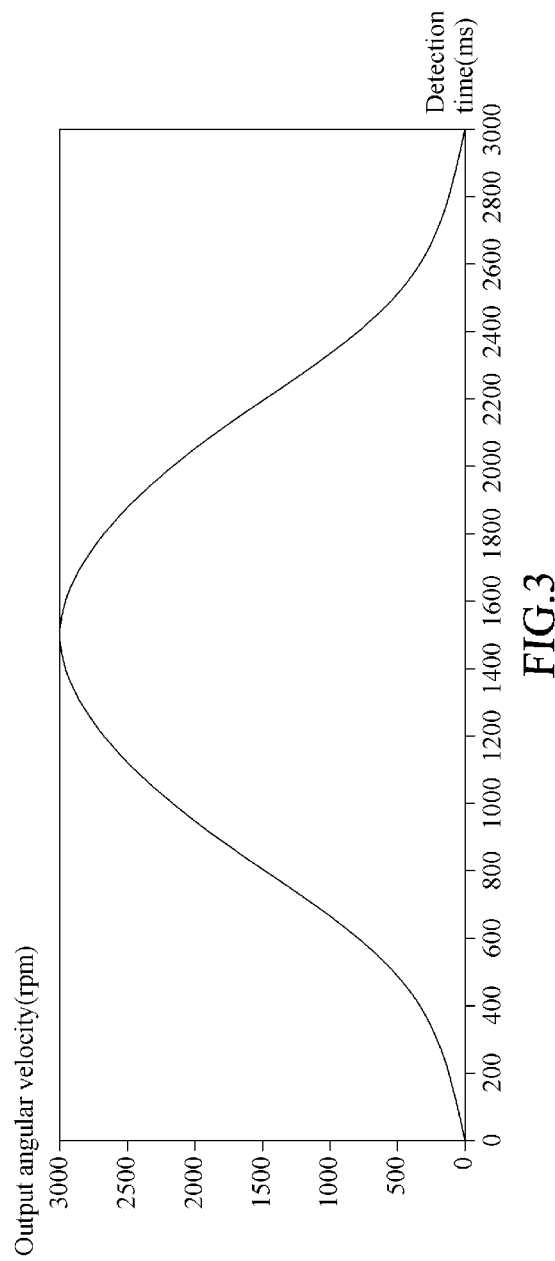
FIG. 3 demonstrates a curve of angular-velocity function data of a first embodiment performing the preferred method for detecting an abnormal state of velocity outputted from a motor in accordance with the present invention.
Figure 4:
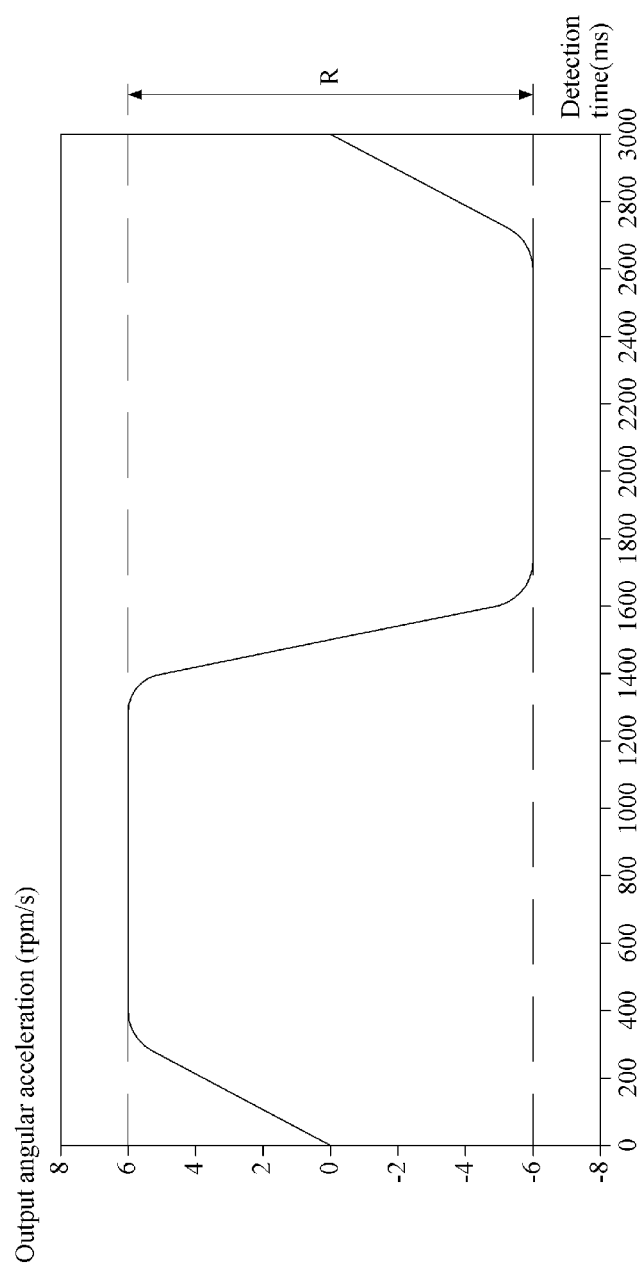
FIG. 4 demonstrates a curve of angular-acceleration function data of the first embodiment performing the preferred method for detecting an abnormal state of velocity outputted from a motor in accordance with the present invention.

Refer now to FIG. 1 through FIG. 4; where FIG. 2A and FIG. 2B together show a flowchart of the preferred method for detecting an abnormal state of velocity outputted from a motor in accordance with the present invention, FIG. 3 demonstrates a curve of angular-velocity function data of a first embodiment performing the preferred method for detecting an abnormal state of velocity outputted from a motor in accordance with the present invention, and FIG. 4 demonstrates a curve of angular-acceleration function data of the first embodiment performing the preferred method for detecting an abnormal state of velocity outputted from a motor in accordance with the present invention. As shown, by accompanying the aforesaid preferred system of the present invention, a preferred method for detecting an abnormal state of velocity outputted from a motor is also provided to determine if or not the servo drive system 2 is in an abnormal rotational-velocity state.

Firstly, in Step S1, the control module 11 is applied to generate a control command S for driving the servo drive system 2, and further to base on the control command S to define an angular-acceleration standard range R with respect to the detection time. In this embodiment, the control command S would drive the servo motor 21 to run 90 cycles at the output angular-velocity value increasing gradually from 0 rpm to the highest 3000 rpm, and then decreasing gradually back to 0 rpm, with the corresponding angular-acceleration standard range R varying from −6 rpm/s to 6 rpm/s, in which the proper angular-acceleration standard range R is, but not limited to be, determined according to the control command S.

Then, in Step S21, while the servo motor 21 is driven, the velocity-detecting module 12 detects a plurality of output angular-velocity values with respect to individual detection times of the servo motor 21. Further, in Step S22, the processing unit 131 differentiates each the output angular-velocity value of the corresponding detection time to obtain a respective output angular-acceleration value of the detection time.

Then, in Step S3, the abnormal-state judging unit 132 determine whether or not each of the output angular-acceleration values of the respective detection times is within the corresponding angular-acceleration standard range R. At the same time, in Step S9, the processing unit 131 would base on each of the detection times and each of the output angular-acceleration values to generate the corresponding angular-acceleration function data. In this embodiment, each individual output angular-acceleration value should be within the respective angular-acceleration standard range R. Namely, each of the output angular-acceleration values shall fall within the range from −6 rpm/s to 6 rpm/s. Thus, in Step S10, if all the output angular-acceleration values of the corresponding detection times are judged to be within the respective angular-acceleration standard range R, the abnormal-state judging unit 132 would determine that the servo drive system 2 runs normally, i.e. in a normal rotational-velocity state.

Figure 5:
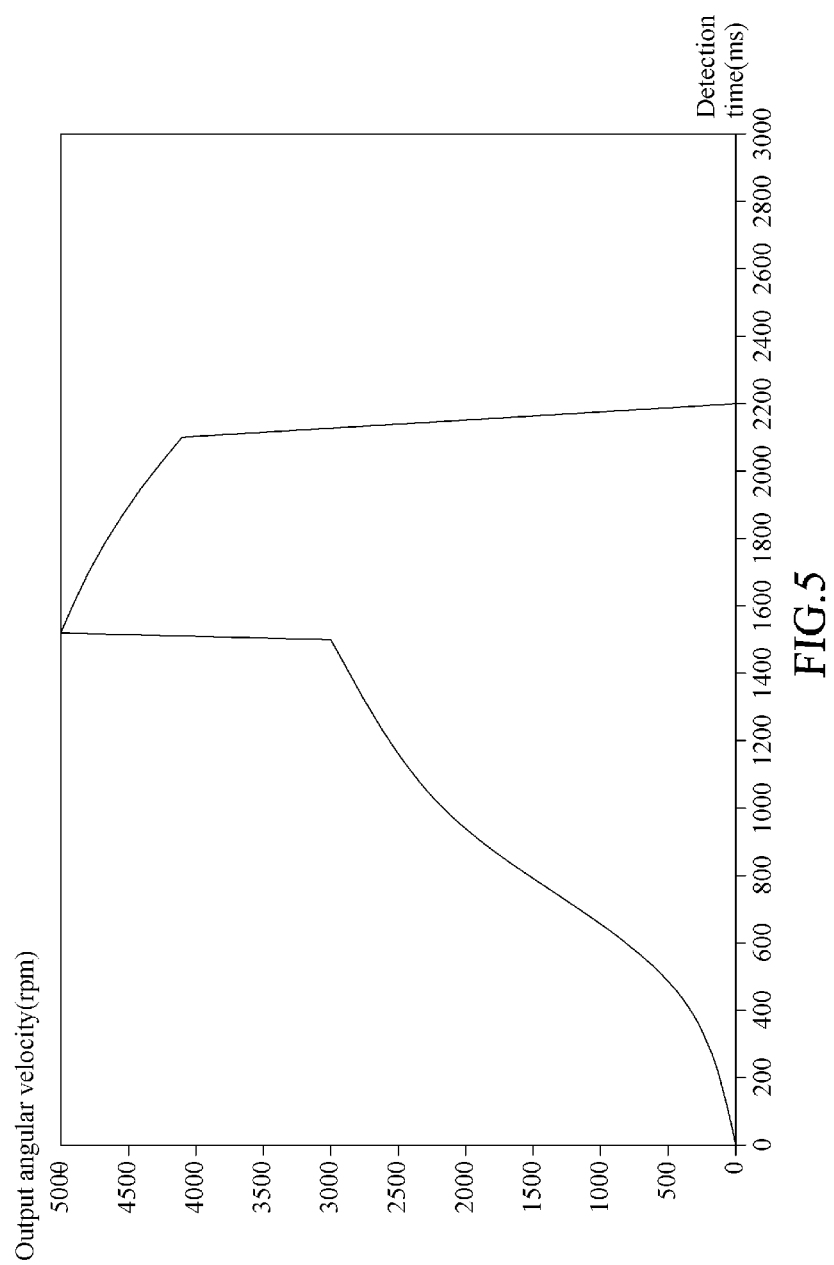
FIG. 5 demonstrates a curve of angular-velocity function data of a second embodiment performing the preferred method for detecting an abnormal state of velocity outputted from a motor in accordance with the present invention.
Figure 6:
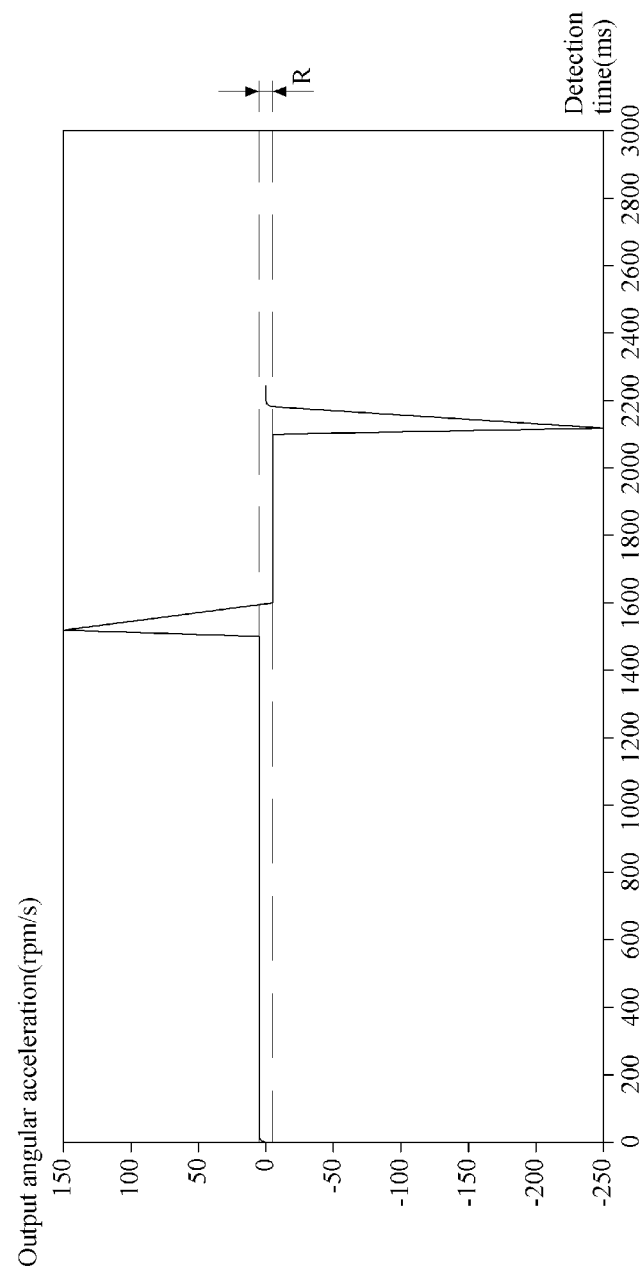
FIG. 6 demonstrates a curve of angular-acceleration function data of the second embodiment performing the preferred method for detecting an abnormal state of velocity outputted from a motor in accordance with the present invention.

Refer now to FIG. 1, FIG. 2A, FIG. 2B, FIG. 5 and FIG. 6; where FIG. 5 demonstrates a curve of angular-velocity function data of a second embodiment performing the preferred method for detecting an abnormal state of velocity outputted from a motor in accordance with the present invention, and FIG. 6 demonstrates a curve of angular-acceleration function data of the second embodiment performing the preferred method for detecting an abnormal state of velocity outputted from a motor in accordance with the present invention.

As shown, in this second embodiment, the framework of the system for detecting an abnormal state of velocity outputted from a motor 1 is mainly similar to that of the foregoing first embodiment. In Step S3, upon when the abnormal-state judging unit 132 is to determine if or not the output angular-acceleration value of the corresponding detection time is within the angular-acceleration standard range R of the detection time, the abnormal-state judging unit 132 determines that not all of the output angular-acceleration values of the respective detection times are within the angular-acceleration standard range R.

Hence, in Step S4, the abnormal-state judging unit 132 would define the corresponding at least one detection time as the at least one abnormal state time for determining the servo drive system 2 to be in the abnormal rotational-velocity state at the abnormal state time. Then, in Step S5, the clock unit 1331 is further used to define at least two detection times to organize one of the at least one time interval, and to determine whether or not the number of the abnormal state times within the individual time interval is greater than the preset abnormal threshold number.

In this embodiment, each said time interval is preset to be 400 ms, and the preset abnormal threshold number is set to be 1. In each of the time intervals, only each of the time interval (1200 ms, 1600 ms) and the time interval (2000 ms, 2400 ms) has one abnormal state time. Hence, it is judged that the number of the abnormal state times of each said time interval is not greater than the preset abnormal threshold number, and only two said time intervals have their own abnormal state times. Thereupon, in Step S6, the servo drive system 2 is determined to be in a low-noise abnormal rotational-velocity state.

Figure 7:
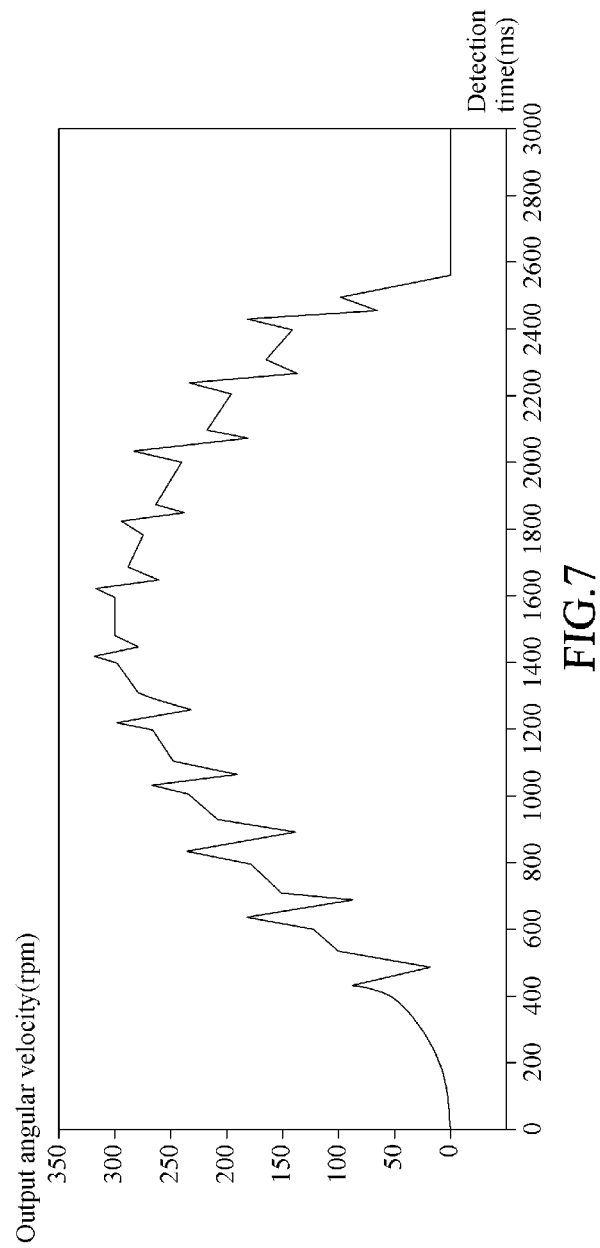
FIG. 7 demonstrates a curve of angular-velocity function data of a third embodiment performing the preferred method for detecting an abnormal state of velocity outputted from a motor in accordance with the present invention.
Figure 8:
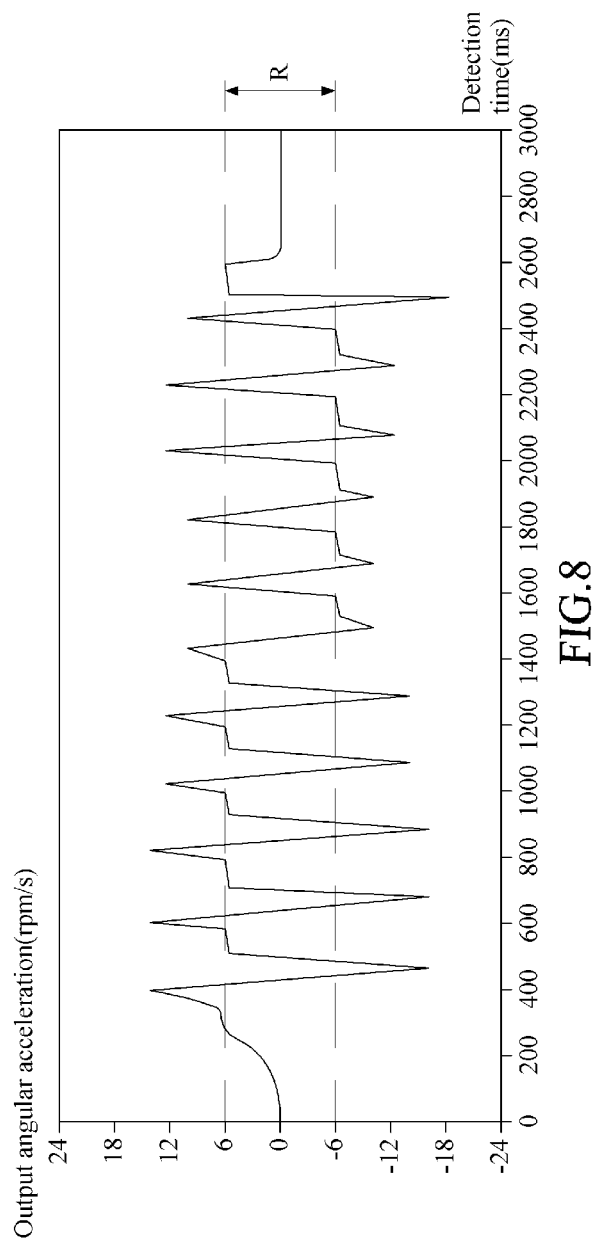
FIG. 8 demonstrates a curve of angular-acceleration function data of the third embodiment performing the preferred method for detecting an abnormal state of velocity outputted from a motor in accordance with the present invention.

Refer now to FIG. 1, FIG. 2A, FIG. 2B, FIG. 7 and FIG. 8; where FIG. 7 demonstrates a curve of angular-velocity function data of a third embodiment performing the preferred method for detecting an abnormal state of velocity outputted from a motor in accordance with the present invention, and FIG. 8 demonstrates a curve of angular-acceleration function data of the third embodiment performing the preferred method for detecting an abnormal state of velocity outputted from a motor in accordance with the present invention.

As shown, in this third embodiment, the framework of the system for detecting an abnormal state of velocity outputted from a motor 1 is mainly similar to that of the foregoing first embodiment. However, in the embodiment, the control command S would drive the servo motor 21 to run 10 cycles at the output angular-velocity value increasing gradually from 0 rpm to the highest 300 rpm, and then decreasing gradually back to 0 rpm, with the corresponding angular-acceleration standard range R varying from −6 rpm/s to 6 rpm/s.

In Step S3, upon when the abnormal-state judging unit 132 is to determine if or not the output angular-acceleration value of the corresponding detection time is within the angular-acceleration standard range R of the detection time, the abnormal-state judging unit 132 determines that all of the output angular-acceleration values of the respective detection times are within the angular-acceleration standard range R. Hence, in Step S4, the abnormal-state judging unit 132 would define the corresponding at least one detection time as the at least one abnormal state time for determining the servo drive system 2 to be in the abnormal rotational-velocity state at the abnormal state time.

Then, in Step S5, the clock unit 1331 is further used to define at least two detection times to organize one of the at least one time interval, and to determine whether or not the number of the abnormal state times within the individual time interval is greater than the preset abnormal threshold number. In this embodiment, each said time interval is preset to be 200 ms, and the preset abnormal threshold number is set to be 1. In the number of the abnormal state times of each of the time intervals between 400 ms and 2800 ms is greater than the preset abnormal threshold number. Since the output angular-velocity value of the servo motor 21 in this embodiment is far than that in the first embodiment, thus the noise data would be magnified and need to be further filtered out.

Figure 9:
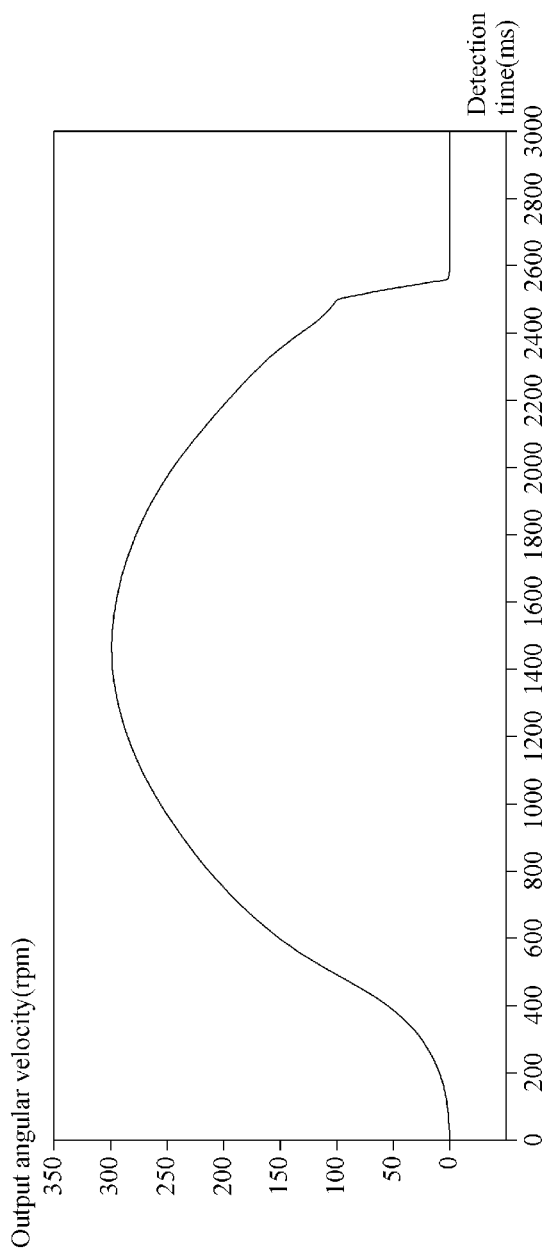
FIG. 9 demonstrates a curve of noise-filtered angular-velocity data of the third embodiment performing the preferred method for detecting an abnormal state of velocity outputted from a motor in accordance with the present invention.
Figure 10:
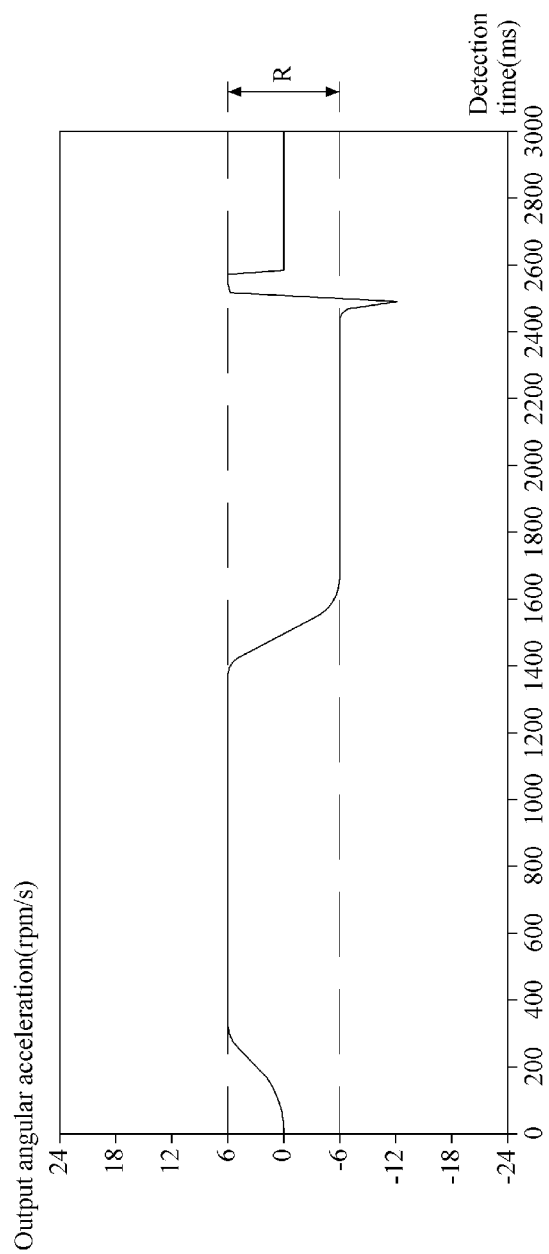
FIG. 10 demonstrates a curve of noise-filtered angular-acceleration function data of the third embodiment performing the preferred method for detecting an abnormal state of velocity outputted from a motor in accordance with the present invention.

Refer now to FIG. 1, FIG. 2A, FIG. 2B, FIG. 9 and FIG. 10; where FIG. 9 demonstrates a curve of noise-filtered angular-velocity data of the third embodiment performing the preferred method for detecting an abnormal state of velocity outputted from a motor in accordance with the present invention; and FIG. 10 demonstrates a curve of noise-filtered angular-acceleration function data of the third embodiment performing the preferred method for detecting an abnormal state of velocity outputted from a motor in accordance with the present invention.

As shown, in the third embodiment, since it is concluded that each of the time intervals between 400 ms and 2800 ms has the number of abnormal state time to be greater than the preset abnormal threshold number, thus the noise-filtering unit 1332 is introduced to filter out the noise data in the angular-acceleration function data, in which the angular-acceleration function data are generated by the processing unit 131 according to the individual detection times and the individual output angular-acceleration values. Thereupon, in Step S71, the corresponding noise-filtered angular-acceleration function data can be formed. Then, in Step S72, it is determined whether or not any of the detection times within the noise-filtered angular-acceleration function data is the abnormal state time.

In the noise-filtered angular-acceleration function data of this embodiment, the time interval between 2400 ms and 2800 ms has an abnormal state time, and thus it can be determined that then the servo drive system 2 is in a high-noise abnormal rotational-velocity state (Step S8). In the noise-filtered angular-acceleration function data of any other embodiment, if each of the time intervals is free from the abnormal state time, then it can be determined that the servo drive system 2 is in a high-noise normal rotational-velocity state (Step S11).

It shall be noted that, in order to explain more clearly the curves of the angular-velocity function data and the angular-acceleration function data, a smoother curve is utilized as a typical example for anew elucidating purpose. However, it shall be understood that a practical curve of the angulangular-acceleration function data may be a severe fluctuating curve.

In summary, in the system and the method for detecting an abnormal state of velocity outputted from a motor, the control module would generate a control command to have the servo motor to run at a higher output angular velocity. The velocity-detecting module and the processing unit are introduced to capture the output angular-acceleration values of the servo motor with respect to the detection times. The abnormal-state judging unit is to judge if or not the output angular-acceleration value of the corresponding detection time is within the respective angular-acceleration standard range. If the output angular-acceleration value falls out of the corresponding angular-acceleration standard range, then the respective detection time undefined as an abnormal state time for determining that the servo drive system is in an abnormal rotational-velocity state at the abnormal state time.

In addition, when the servo motor runs at a lower output angular velocity to cause the number of the abnormal state times in each time interval to be greater than the preset abnormal threshold number, then the noise-filtering unit can be applied to filter out the noise data in the angular-acceleration function data, such that the noise-filtered angular-acceleration function data can be formed. Then, upon judging whether any detection time in the noise-filtered angular-acceleration function data is an abnormal state time, if the number of the abnormal state times in each individual time interval is not greater than the preset abnormal threshold number, then the high-noise abnormal rotational-velocity state of the servo drive system at the abnormal state time can be determined.

By comparing rob the prior art, the system and the method for detecting an abnormal state of velocity outputted from a motor provided by the present invention introduces the abnormal-state judging unit to determine whether or not the output angular-acceleration value of the corresponding detection time is within the respective angular-acceleration standard range. In addition, when the number of the abnormal state time in each individual time interval is greater than the preset abnormal threshold number, the noise-filtering unit can be utilized to filter out the noise data, and then the servo drive system is further judged to be in the high-noise abnormal rotational-velocity state or not.

Thereupon, the present invention can completely replace the conventional art that uses naked eyes to compare the waveforms of the control command and the rotational-velocity feedback signal of the servo motor on the oscilloscope, so that inaccurate detections caused by misjudgment can be reduced to a minimum. In addition, by having the system and the method for detecting an abnormal state of velocity outputted from a motor in accordance with the present invention to detect the servo motor, additional expense and labor from conventional naked-eyes investigation can thus be substantially avoided.

While the present invention has been particularly shown and described with reference to a preferred embodiment, it will be understood by those skilled in the art that various changes in form and detail may be without departing from the spirit and scope of the present invention.

What is claimed is:

1. A system for detecting an abnormal state of velocity outputted from a motor, applied to detect a servo motor of a servo drive system, comprising:

a control module, communicatively connected with the servo drive system, being to generate a control command for controlling the servo drive system, basing on the control command to define a plurality of angular-acceleration standard ranges with respect to a plurality of detection times;

a velocity-detecting module, communicatively connected with the servo drive system, being to detect a plurality of output angular-velocity values of the servo motor at the plurality of detection times while the servo motor is driven; and a state-analyzing module, including:

a processing unit, communicatively connected with the velocity-detecting module, being to store the plurality of output angular-velocity values, basing on the plurality of output angular-velocity values to calculate a plurality of output angular-acceleration values with respect to the plurality of detection times, generating angular-velocity function data with respect to the plurality of detection times and the plurality of corresponding output angular-velocity values, and differentiating the angular-velocity function data to generate angular-acceleration function data; and an abnormal-state judging unit, connected with the control module and the processing unit, being to determine whether or not each of the output angular-acceleration values with respect to each of the corresponding detection times is within the respective angular-acceleration standard range and thereby to generate a plurality of corresponding comparison results; wherein, if at least one of the plurality of comparison results is negative, the corresponding at least one said detection time is defined as at least one abnormal state time for determining that the servo drive system is in an abnormal rotational-velocity state at the at least one abnormal state time; and a noise-filtering module, communicatively connected with the abnormal-state judging unit so as thereby to filter out noise data of the angular-acceleration function data upon when a number of the at least one abnormal state time is greater than a preset abnormal threshold number, further including:

a clock unit, being to define at least two of the plurality of detection times to be one of a plurality of time intervals; and a noise-filtering unit, electrically coupled with the clock unit, being to filter out the noise data in the angular-acceleration function data upon when the number of the at least one abnormal state time at each said time interval is greater than the preset abnormal threshold number.

2. A method for detecting an abnormal state of velocity outputted from a motor, applied to determine whether or not a servo drive system is in an abnormal rotational-velocity state, comprising the steps of:

(a) when a servo motor of the servo drive system is driven, capturing a plurality of output angular-acceleration values with respect to the servo motor at a plurality of detection times;

(b) determining whether or not each said output angular-acceleration value with respect to each said detection time is within the plurality of corresponding angular-acceleration standard ranges; and (c) if a result of the Step (b) is negative, defining the at least one corresponding detection time as at least one abnormal state time for determining that the servo drive system is in the abnormal rotational-velocity state at the at least one abnormal state time;

(e) generating angular-acceleration function data based on the plurality of detection times and the plurality of output angular-acceleration values;

(f) after the servo drive system is judged to be in the abnormal rotational-velocity state at the at least one abnormal state time, determining whether or not the number of the at least one abnormal state time at the plurality of detection times is greater than a preset abnormal threshold number, defining at least two of the plurality of detection times to be one of a plurality of time intervals, determining whether or not the number of the at least one abnormal state time in each said time interval is greater than the preset abnormal threshold number;

(g) if a result of the Step (f) is negative, determining that the servo drive system is in a low-noise abnormal rotational-velocity state;

(h) if the result of the Step (f) is positive, filtering out noise data in the angular-acceleration function data so as to form noise-filtered angular-acceleration function data, and determining whether or not the plurality of detection times in the noise-filtered angular-acceleration function data have the at least one abnormal state time: and (i) if the result of the Step (h) is positive, determining that the servo drive system is in a high-noise abnormal rotational-velocity state.

3. The method for detecting an abnormal state of velocity outputted from a motor of claim 2, prior to the step (a), further including a step of:

(d) generating a control command for driving the servo drive system, and basing on the control command to define the plurality of angular-acceleration standard ranges wish respect to the plurality of detection times.

4. The method for detecting an abnormal state of velocity outputted from a motor of claim 2, wherein the Step (a) further includes the steps of:

(a1) while the servo motor is driven, detecting a plurality of output angular-velocity values with respect to the servo motor at the plurality of detection times; and (a2) calculating the plurality of output angular-acceleration values from the plurality of output angular-velocity values.

5. The method for detecting an abnormal state of velocity outputted from a motor of claim 4, wherein the plurality of output angular-velocity values are differentiated to obtain the plurality of output angular-acceleration values.

* * * * *